United States Patent
Axelsson et al.

(10) Patent No.: US 9,936,432 B2
(45) Date of Patent: Apr. 3, 2018

(54) METHOD AND A NETWORK NODE FOR IMPROVED RESOURCE UTILIZATION IN A LOAD BALANCED RADIO COMMUNICATION SYSTEM

(71) Applicant: Telefonaktiebolaget L M Ericsson (publ), Stockholm (SE)

(72) Inventors: Samuel Axelsson, Linköping (SE); Rasmus Axén, Linköping (SE); Sven Ekemark, Storvreta (SE); Olof Axel Granberg, Sollentuna (SE); Walter Müller, Upplands Väsby (SE); Parisa Pakniat, Norrköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 110 days.

(21) Appl. No.: 14/759,315

(22) PCT Filed: Jan. 11, 2013

(86) PCT No.: PCT/SE2013/050014
§ 371 (c)(1),
(2) Date: Jul. 6, 2015

(87) PCT Pub. No.: WO2014/109681
PCT Pub. Date: Jul. 17, 2014

(65) Prior Publication Data
US 2015/0358883 A1 Dec. 10, 2015

(51) Int. Cl.
*H04W 4/00* (2009.01)
*H04W 36/16* (2009.01)
(Continued)

(52) U.S. Cl.
CPC ......... *H04W 36/165* (2013.01); *H04W 24/08* (2013.01); *H04W 28/08* (2013.01);
(Continued)

(58) Field of Classification Search
CPC . H04W 36/0055; H04W 36/20; H04W 36/22; H04W 36/38; H04W 36/165;
(Continued)

(56) References Cited

U.S. PATENT DOCUMENTS

2006/0293060 A1    12/2006  Yang et al.
2007/0232311 A1*   10/2007  Kuhn ................... H04W 36/22
                                                         455/436
(Continued)

FOREIGN PATENT DOCUMENTS

EP    2 073 579 A1    6/2009
EP    2 262 313       12/2010
(Continued)

OTHER PUBLICATIONS

3GPP TS 36.413 V11.1.0; Technical Specification; 3rd Generation Partnership Project; Technical Specification Group Radio Access Network; Evolved Universal Terrestrial Radio Access Network (E-UTRAN); S1 Application Protocol (S1AP) (Release 11), Sep. 2012.

(Continued)

*Primary Examiner* — Harun Chowdhury
(74) *Attorney, Agent, or Firm* — Patent Portfolio Builders, PLLC

(57) ABSTRACT

The present disclosure concerns movements, such as handovers, of user equipments (UEs) 120a-e from one radio cell 130a to another radio cell 130b. Disclosed herein are methods as well radio network nodes 110a, 110b. A radio network node 110a, 110b may, for example, select the most suitable UE(s) 20a-e to move from a source radio cell 130a to a target radio cell 130b in case the traffic load in the source radio cell 130a is below or equal to the traffic load of the target radio cell 130b. Hereby it is made possible to improve the resource utilization.

27 Claims, 6 Drawing Sheets

(51) Int. Cl.
*H04W 36/08* (2009.01)
*H04W 24/08* (2009.01)
*H04W 28/08* (2009.01)
*H04W 36/22* (2009.01)
*H04W 36/30* (2009.01)

(52) U.S. Cl.
CPC ............ *H04W 36/08* (2013.01); *H04W 36/22* (2013.01); *H04W 36/30* (2013.01)

(58) Field of Classification Search
CPC ... H04W 36/245; H04W 28/08; H04W 36/08; H04W 36/18; H04W 36/24; H04W 36/30
USPC ............... 370/235, 329, 331, 342, 252, 332; 455/436, 438
See application file for complete search history.

(56) References Cited

U.S. PATENT DOCUMENTS

| | | | |
|---|---|---|---|
| 2011/0002221 A1* | 1/2011 | Turk | H04W 36/22 370/235 |
| 2011/0124332 A1 | 5/2011 | Zhang et al. | |
| 2012/0088507 A1* | 4/2012 | Legg | H04W 36/245 455/436 |
| 2013/0040692 A1* | 2/2013 | Chen | H04W 36/04 455/525 |
| 2013/0337815 A1* | 12/2013 | Sebire | H04W 36/0055 455/438 |

FOREIGN PATENT DOCUMENTS

| | | |
|---|---|---|
| WO | WO 02/32156 A2 | 4/2002 |
| WO | WO 2010/078589 A2 | 7/2010 |
| WO | WO 2012/125103 A1 | 9/2012 |

OTHER PUBLICATIONS

3GPP TS 36.423 V11.2.0; Technical Specification; 3rd Generation Partnership Project; Technical Specification Group Radio Access Network; Evolved Universal Terrestrial Radio Access Network (E-UTRAN); X2 application protocol (X2AP) (Release 11), Sep. 2012.
Supplementary European Search Report for Application No. 13 87 0605—dated Aug. 24, 2016.
International Search Report for International application No. PCT/SE2013/050014, dated Jan. 29, 2014.
PCT Written Opinion of the International Searching Authority for International application No. PCT/SE2013/050014, dated Jan. 29, 2014.

* cited by examiner

METHOD AND A NETWORK NODE FOR IMPROVED RESOURCE UTILIZATION IN A LOAD BALANCED RADIO COMMUNICATION SYSTEM

PRIORITY

This nonprovisional application is a U.S. National Stage Filing under 35 U.S.C. § 371 of International Patent Application Serial No. PCT/SE2013/050014, filed Jan. 11, 2013, and entitled "A Method And A Network Node For Improved Resource Utilization In A Load Balanced Radio Communication System."

TECHNICAL FIELD

Embodiments presented herein generally relate to radio communication networks. More particularly, the embodiments presented herein relates to movements (e.g. handovers) of user equipments between radio cells.

BACKGROUND

Detailed descriptions of radio communication networks and systems can be found in literature, such as in Technical Specifications published by, e.g., the $3^{rd}$ Generation Partnership Project (3GPP). 3GPP Long Term Evolution (LTE) is the fourth-generation radio communication technologies standard developed within the $3^{rd}$ Generation Partnership Project (3GPP) to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an UTRAN and an E-UTRAN, a user equipment (UE) is wirelessly connected to a Radio Base Station (RBS) commonly referred to as a NodeB (NB) in UMTS, and as an evolved NodeB (eNodeB or eNB) in LTE. An RBS is a general term for a radio network node capable of transmitting radio signals to a UE and receiving signals transmitted by a UE.

In radio communication systems, traffic between UEs and radio network nodes is neither homogenously distributed in the radio cells nor is it constant over time. That is, during certain time periods a certain radio cell may be heavily loaded by traffic whereas neighboring radio cells may have a low, or limited, traffic load. Load balancing, i.e. balancing of traffic load between cells, has therefore been proposed as a way to improve the overall performance of radio communication systems for such inhomogeneous situations. Detailed descriptions of load balancing, e.g. as supported by the 3GPP, can be found in literature such as in the *Technical Specification 3GPP TS* 36.300 V. 11.4.0, see e.g. section 22.4.1. As is known among persons skilled in the art, there exist different ways of balancing traffic load between cells. With load balancing, the cells having a low traffic load can for example become larger and absorb some of the UEs from overloaded neighboring cells. Although these UEs may be relatively far from the new radio network node that is serving the UEs of the new cell, those UEs can be forced to move, e.g. handover, from the overloaded radio cell to a less loaded radio cell. Consequently and to sum up, load balancing is a means to improve the overall performance in terms of balancing the traffic load between the radio cells. In this regard, it should be appreciated that load balancing is not only preformed when the radio cells are on the same frequency and generally cover different geographical areas. Load balancing can for example also be performed when the radio cells are on different frequencies and, e.g., cover partly overlapping radio cells.

However, although the radio cells are balanced in terms of traffic load, there may be occasions when resource utilization is not optimized, or at least not desirably good. For instance, there may be occasions when the resource utilization in terms of how much radio resources that are required to transmit/receive information bits to/from the UE (e.g., bits per Physical Resource Block (PRB)) is not optimal, or at least not desirably good. Furthermore, if one radio cell has a traffic load that is constantly higher than that of a neighboring cell, the load balancing will generally have the effect that UEs are only moved in one direction. That is, the UEs will generally be moved in the direction from the radio cell with the comparatively higher traffic load to the other radio cell (i.e. the radio cell having the comparatively lower traffic load).

SUMMARY

It is in view of the above considerations and others that the various embodiments disclosed herein have been made.

It is a general object to provide for improved resource utilization in a radio communication system. Advantageously, embodiments described in this disclosure should also allow for improved resource utilization in a radio communication system when neighboring radio cells have been load balanced, e.g. load balanced for a certain period of time.

The various embodiments as set forth in the appended independent claims address this general object. The appended dependent claims represent additional advantageous embodiments.

According to an aspect, there is provided a method performed by a radio network node, which is serving a source radio cell. The method comprises: determining a traffic load parameter pertaining to a traffic load of a source radio cell; receiving, from a radio network node serving a target radio cell, a signal comprising a traffic load parameter pertaining to a traffic load of the target radio cell; comparing the traffic load parameter of the source radio cell with the traffic load parameter of the target radio cell to determine whether the traffic load parameter of the source radio cell is below or equal to the traffic load parameter of the target radio cell; receiving a signal, from each one of one or more user equipments, UE(s), said signal comprising a measured signal parameter pertaining to the source radio cell and a measured signal parameter pertaining to the target radio cell; determining one or more UE(s) to select, based on the measured signal parameter pertaining to the source radio cell and the measured signal parameter pertaining to the target radio cell for each of the UE(s); selecting to move the determined one or more UE(s) from the source radio cell to the target radio cell, in case the traffic load parameter of the source radio cell is below or equal to traffic load parameter of the target radio cell; and moving (280) the selected UE(s) to the target radio cell.

Prior to receiving said signal from each one of said one or more UE(s), the method may optionally comprise transmitting a signal to said one or more UE(s), said signal comprising a request to the UE(s) to measure a signal parameter pertaining to the source radio cell and to measure a signal parameter pertaining to the target radio cell.

In some embodiments, the method also comprises starting a timer in case the traffic load parameter of the source radio cell is determined to be below or equal to the traffic load parameter of the target radio cell, and moving the selected UE(s) only in response to that the timer has reached a pre-defined time limit.

In one embodiment, the signal parameter is a Reference Signal Received Power (RSRP) value. The method may thus comprise: comparing a measured RSRP value pertaining to the source radio cell and a measured RSRP value pertaining to the target radio cell for each of the UE(s), and determining the UE(s) to select on the basis of which UE(s) has/have the largest difference between the measured RSRP value pertaining to the target radio cell and the measured RSRP value pertaining to the source radio cell. Alternatively, the method may comprise: determining the UE(s) to select on the basis of which UE(s) has/have the highest measured RSRP value(s) pertaining to the target radio cell.

In another embodiment, the signal parameter is a Reference Signal Received Quality (RSRQ) value. The method may thus comprise: comparing the measured RSRQ value pertaining to the source radio cell and the measured RSRQ value pertaining to the target radio cell for each of the UE(s), and determining the UE(s) to select on the basis of which UE(s) has/have the largest difference between the measured RSRQ value pertaining to the target radio cell and the measured RSRQ value pertaining to the source radio cell for each of the UE(s). Alternatively, the method may comprise determining the UE(s) to select on the basis of which UE(s) has/have the highest measured RSRQ values pertaining to the target radio cell.

Also, moving the selected UE(s) to the target radio cell may comprise transmitting a signal including a HANDOVER REQUEST to the radio network node that is serving the target radio cell. Said signal including the HANDOVER REQUEST may additionally comprise a cause information element indicating the cause of the movement of UE(s). Yet further, the method may comprise receiving a signal including a HANDOVER REQUEST ACKNOWLEDGEMENT from the radio network node that is serving the target radio cell.

Furthermore, determining the traffic load parameter of the source radio cell pertaining to the traffic load of the source radio cell; receiving the signal comprising the traffic load parameter of the target radio cell pertaining to the traffic load of the target radio cell; and comparing the traffic load parameter of the source radio cell with the traffic load parameter of the target radio cell to see whether the traffic load parameter of the source radio cell is below or equal to the traffic load parameter of the target cell may, in some embodiments, be performed continuously or at pre-set intervals.

Still further, the method may comprise determining that the source radio cell and the target radio cell are load-balanced in case the traffic load parameter of the source radio cell is equal to the traffic load parameter of the target radio cell.

According to another aspect, there is provided a radio network node for serving a source radio cell. The radio network node comprises a receiver configured to receive, from a radio network node serving a target radio cell, a signal comprising a traffic load parameter pertaining to a traffic load of the target radio dell; wherein the receiver is furthermore configured to receive a signal, from each one of one or more UE(s), said signal comprising a measured signal parameter pertaining to the source radio cell and a measured signal parameter pertaining to the target radio cell; as well as a processor, and a memory storing computer program code, which, when run in the processor causes the radio network node to: determine a traffic load parameter pertaining to a traffic load of a source radio cell; compare the traffic load parameter of the source radio cell with the traffic load parameter of the target radio cell to determine whether the traffic load parameter of the source radio cell is below or equal to the traffic load parameter of the target radio cell; determine one or more UE(s) to select, based on the measured signal parameter pertaining to the source radio cell and the measured signal parameter pertaining to the target radio cell for each of the UE(s); select to move the determined one or more UE(s) from the source radio cell to the target radio cell, in case the traffic load parameter of the source radio cell is below or equal to traffic load parameter of the target radio cell; and move the selected UE(s) to the target radio cell.

The radio network node may further comprise a transmitter configured to transmit a signal to said one or more UE(s), said signal comprising a request to the UE(s) to measure a signal parameter pertaining to the source radio cell and to measure a signal parameter pertaining to the target radio cell.

Also, the radio network node may further comprise a timer. The memory and the computer program code may be configured to, with the processor, cause the radio network node to start the timer in case the traffic load parameter of the source radio cell is determined to be below or equal to traffic load parameter of the target radio cell, and move the selected UE(s) only in response to that the timer has reached a pre-defined time limit.

In one embodiment, the signal parameter is a Reference Signal Received Power (RSRP) value. The memory and the computer program code may be configured to, with the processor, cause the radio network node to: compare a measured RSRP value pertaining to the source radio cell and a measured RSRP value pertaining to the target radio cell for each of the UE(s), and determine the UE(s) to select on the basis of which UE(s) has/have the largest difference between the measured RSRP value pertaining to the target radio cell and the measured RSRP value pertaining to the source radio cell. Alternatively, the memory and the computer program code may be configured to, with the processor, cause the radio network node to: determine the UE(s) to select on the basis of which UE(s) has/have the highest measured RSRP value(s) pertaining to the target radio cell.

In an alternative embodiment, the signal parameter is a Reference Signal Received Quality (RSRQ) value. The memory and the computer program code may be configured to, with the processor, cause the radio network node to: compare the measured RSRQ value pertaining to the source radio cell and the measured RSRQ value pertaining to the target radio cell for each of the UE(s), and determine the UE(s) to select on the basis of which UE(s) has/have the largest difference between the measured RSRQ value pertaining to the target radio cell and the measured RSRQ value pertaining to the source radio cell for each of the UE(s). Alternatively, the memory and the computer program code are configured, with the processor, to cause the radio network node to: determine the UE(s) to select on the basis of which UE(s) has/have the highest measured RSRQ values pertaining to the target radio cell.

In some embodiments, the transmitter may be configured to transmit a signal including a HANDOVER REQUEST to the radio network node that is serving the target radio cell. For example, the transmitter may be configured to transmit said signal including the HANDOVER REQUEST, wherein this signal additionally comprises a cause information element indicating the cause of the movement of UE(s). Also, the receiver may be configured to receive a signal including a HANDOVER REQUEST ACKNOWLEDGEMENT from the radio network node that is serving the target radio cell.

In some embodiments, the receiver may be configured to receive the signal comprising the traffic load parameter of the target radio cell pertaining to the traffic load of the target radio cell continuously or at pre-set intervals. Also, the memory and the computer program code may be configured to, with the processor, cause the radio network node to determine the traffic load parameter of the source radio cell pertaining to the traffic load of the source radio cell; and compare the traffic load parameter of the source radio cell with the traffic load parameter of the target radio cell to determine whether the traffic load parameter of the source radio cell is below or equal to the traffic load parameter of the target cell continuously or at pre-set intervals.

Furthermore, the memory and the computer program code may be configured to, with the processor, cause the radio network node to determine that the source radio cell and the target radio cell are load-balanced in case the traffic load parameter of the source radio cell is equal to the traffic load parameter of the target radio cell.

Finally, the radio network node maybe an evolved NodeB (eNB).

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The invention will now be described more fully hereinafter with reference to the accompanying drawings, in which certain embodiments are shown. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

Figure 1A:
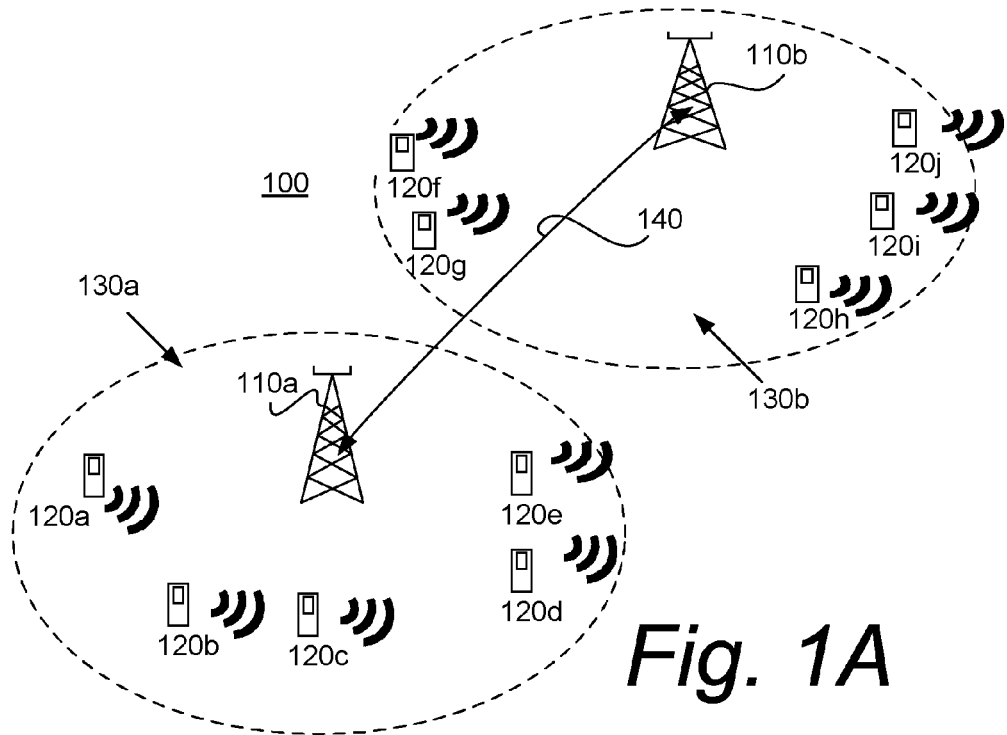
FIG. 1 shows a schematic illustration of an example radio access network.

FIG. 1 illustrates an example scenario in a 3GPP LTE radio communication system 100. Accordingly, FIG. 1 illustrates a radio access network (RAN) in an LTE radio communication system 100. In this example, there are two radio network nodes 110a and 100b, each of which is exemplified as an evolved NodeB, eNB. A first eNB 110a is configured to serve one or several UEs, 120a-e, located within the eNB's 100a geographical area of service or the cell 130a. The eNB 110a is connectable to a core network (CN). The eNB 101a is also connectable, e.g. via an X2 interface, to a neighboring eNB 110b configured to serve another cell 130b. Accordingly, the second eNB 110b is configured to serve one or several UEs, 120f-j, located within the eNB's 100b geographical area of service or the cell 130b. The eNB 110b is also connectable to a CN.

As used hereinafter, it should be appreciated that a target radio cell may refer in particular to a radio cell associated with a target eNB, whereas a source radio cell is generally associated with a source eNB. Hence, although each eNB may comprise several radio cells, the source cell and the target cell can be served by different eNBs. Furthermore, as used in this disclosure, the term "UE" is any device, which can be used by a user to communicate. Also, the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes MTC (Machine Type Communication) devices, which do not necessarily involve human interaction. Also, the term "radio network node" as used herein generally denotes a fixed point being capable of communicating with the UE. As such, it may be referred to as a base station, a radio base station, a NodeB or an evolved NodeB (eNB), access point, etcetera.

Figure 1B:
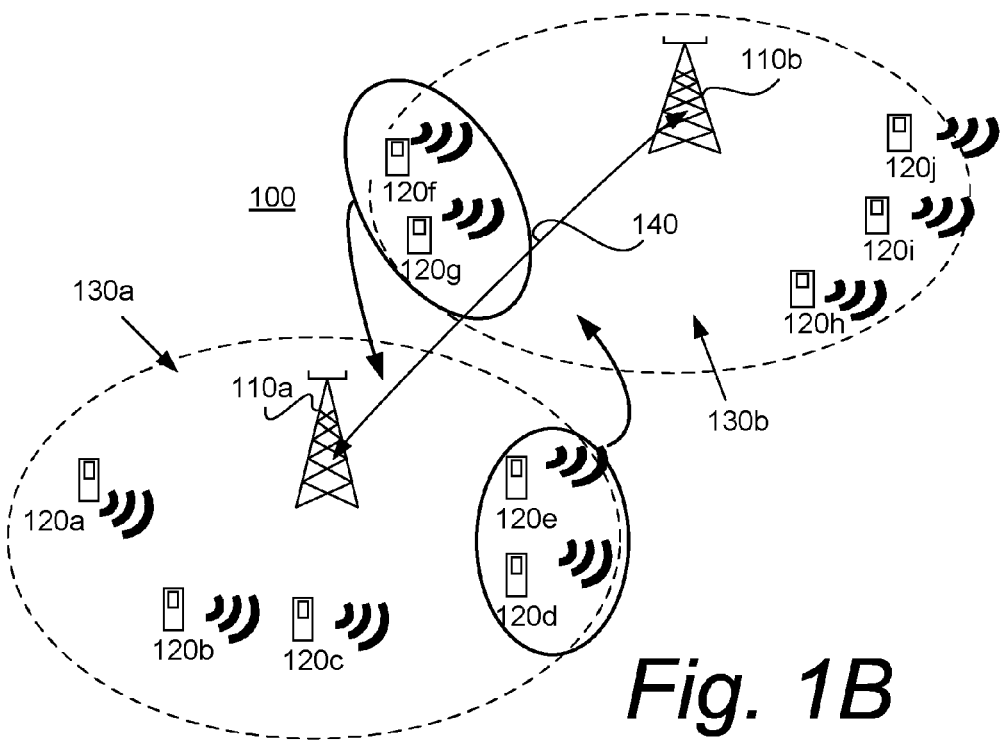
Figure 2:
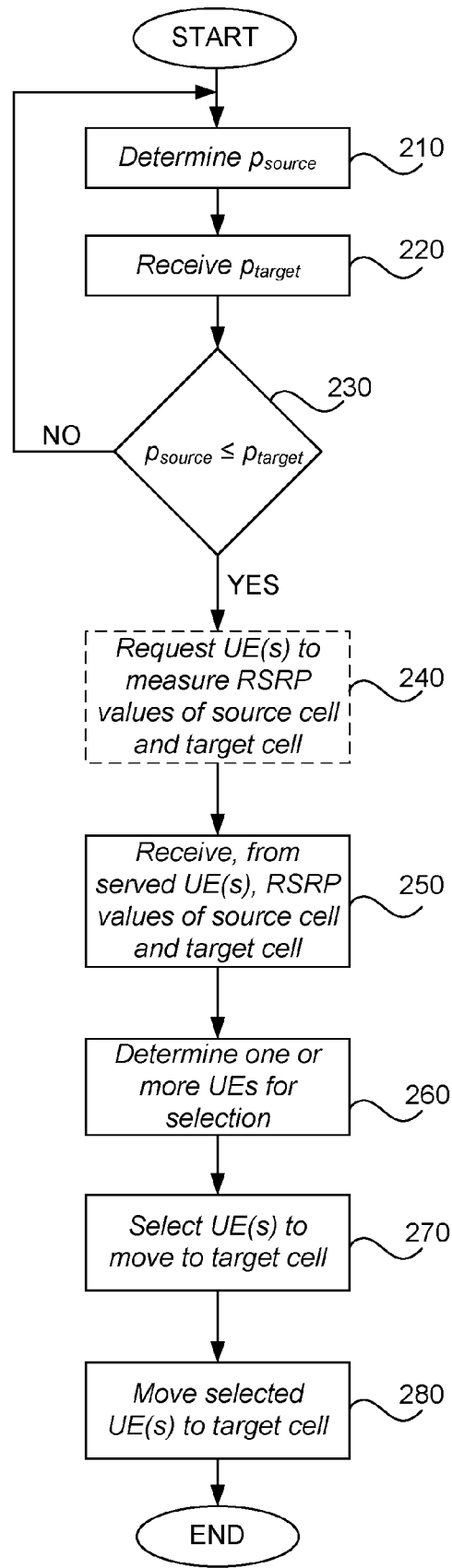
FIG. 2 is a flow chart illustrating a method according to an embodiment.

With reference to FIG. 2, an example embodiment is illustrated. The method is performed by a radio network node. For example, the radio network node may be an eNB, such as eNB 110a or eNB 110b shown in FIG. 1. In the following, it is assumed that the method is performed by the eNB 110a illustrated in FIG. 1. The eNB 110a serves a first radio cell 130a, hereinafter referred to as the source radio cell. Or said differently, the eNB 110a serves one or several UEs in the source radio cell 130a. Also, in the following it is assumed that the eNB 110b serves a second radio cell 130b, which is referred to as the target radio cell. In other words, the eNB 110b serves one or several UEs in the target radio cell 130b. Accordingly, the eNB 110a could be called source radio network node, or source eNB. Likewise, the eNB 110b could be called target radio network node, or target eNB.

The radio network node 110a determines 210 a traffic load parameter $p_{source}$. The traffic load parameter $p_{source}$ is a parameter indicating the traffic load of the source radio cell 130a. Consequently, the traffic load parameter $p_{source}$ pertains to the traffic load of the source radio cell 130a. The traffic load parameter $p_{source}$ can be one of a set of measurable factors that determine the traffic load of the source radio cell 130a. The set of measurable factors may, for instance, include: the number of UEs in the source radio cell 130a, the radio resource utilization in the source radio cell 130a (e.g., the physical resource block (PRB) utilization), data throughput or data buffering queue sizes, the total transmitted output power in the source radio cell 130a, etc. Alternatively, the factor may be a so-called subscription ratio value as described in the international patent application WO 2012/125103 A1. The determination 210 of the traffic load parameter $p_{source}$ may, in some embodiments, be performed continuously (i.e. in a continuous manner). In alternative embodiments, it is conceivable to determine 210 the traffic load parameter $p_{source}$ at pre-set intervals. For example, the pre-set intervals may be set to every 5, 10, 15, 20, 25 or 30 seconds.

The radio network node 110a also receives 220 a signal including information about a traffic load parameter $p_{target}$. The traffic load parameter $p_{target}$ is a parameter indicating the traffic load of a target radio cell 130b. Consequently, the traffic load parameter $p_{target}$ pertains to the traffic load of the target radio cell 130b. For example, the eNB 110a may receive this signal including the information about the traffic load parameter $p_{target}$ from the target eNB, i.e. eNB 110b in this example. For instance, the eNB 110a may receive this signal from the eNB 110b over an X2 interface 140. This may, e.g., be carried out according to signaling procedures and messages as further detailed in the X2 Application Protocol, X2AP, see 3GPP TS 36.423 V.11.3.0. The traffic load parameter $p_{target}$ can be one of a set of measurable factors that determine the traffic load of the target radio cell 130b. The set of measurable factors may, for instance, include: the number of UEs in the target radio cell 130b, the radio resource utilization in the target radio cell 130a (e.g., the physical resource block (PRB) utilization), data throughput or data buffering queue sizes, the total transmitted output power in the target radio cell 130b, etc. Alternatively, the factor may be a so-called subscription ratio value as described in the international patent application WO 2012/125103 A1. In some embodiments, the radio network node 110a can receive 220 the signal including the traffic load parameter $p_{target}$ continuously (i.e. in a continuous manner). In alternative embodiments, it is conceivable that the radio network node 110a receives 220 the signal including the traffic load parameter $p_{target}$ at pre-set intervals. For example, the pre-set intervals may be set to every 5, 10, 15, 20, 25 or 30 seconds. Moreover, the radio network node 110a may receive 220 said signal including the traffic load parameter $p_{target}$ following a request, i.e. after the radio network node 110a has transmitted a signal (to the radio network node 110b serving the target radio cell) requesting the signal including the information about the traffic load parameter $p_{target}$.

Instead of receiving the signal including information about $p_{target}$ from eNB 110b as exemplified above, it is conceivable that, in alternative embodiments, the eNB 110a could instead receive the signal including information about the traffic load parameter $p_{target}$ from another node of the CN, e.g. a Mobility Management Entity (MME) or a Serving Gateway (S-GW). If so, this could be carried out according to signaling procedures and messages as further detailed in the S1 Application Protocol, S1AP, see 3GPP TS 36.413 V.11.2.0.

The traffic load parameter $p_{source}$ of the source radio cell 130a is compared 230 with the traffic load parameter $p_{target}$ of the target radio cell 130b. For example, the traffic load parameter $p_{source}$ of the source radio cell 130a may be compared 230 with the traffic load parameter $p_{target}$ of the target radio cell 130b to determine whether the traffic load parameter $p_{source}$ of the source radio cell is below or equal to the traffic load parameter $p_{target}$ of the target radio cell. In other words, the two traffic load parameters may be compared to determine whether $p_{source} \leq p_{target}$. Since the traffic load parameters pertain to the traffic loads of the respective radio cells, when it is determined that $p_{source} \leq p_{target}$ it can be concluded or determined, by the eNB 110a, that the traffic load in the source cell 130a is lower or equal to the traffic load of the target cell 130b.

If the two traffic load parameters are the same (i.e. $p_{source} = p_{target}$) the radio network node may conclude, or determine, that the traffic loads of the source radio cell and the target radio cell, respectively, are the same. Likewise, if the two traffic load parameters are substantially the same (i.e. $p_{source} \sim p_{target}$), the radio network node may conclude, or determine, that the traffic loads of the source radio cell and the target radio cell, respectively, are substantially same. When the traffic load is the same or substantially the same in the source radio cell 130a and in the target radio cell 130b, there is a balance in the traffic load in the source radio cell and the target radio cell, respectively. Consequently, when the $p_{source}$ and the $p_{target}$ are the same, or substantially the same, the eNB 110a can conclude, or determine, that the source radio cell 130a and the target radio cell 130b are load-balanced. Sometimes, the load balance is called equalized load balance when the $p_{source}$ and the $p_{target}$ have been determined to be the same, or substantially the same.

In some embodiments, the eNB 110a could determine that the traffic load in source radio cell 130a and in the target radio cell 130b, respectively, are substantially the same (i.e. $p_{source} \sim p_{target}$), when the absolute value of the difference between the traffic load parameter $p_{source}$ of the source radio cell 130a and the traffic load parameter $p_{target}$ of the target radio cell 130b is below a pre-defined threshold. That is, the eNB 110a could determine that $p_{source}$ and $p_{target}$ are substantially the same when $|p_{source} - p_{target}| < $ threshold. The exact value of the threshold should be tested and evaluated in each specific case, for example based on operator needs. To name only a few examples, the threshold could be set to 0.01, 0.02, 0.03, 0.04, or 0.05.

When it has been determined 230 that the traffic load parameter of the source radio cell $p_{source}$ is the same, or substantially the same, as the traffic load parameter of the target radio cell $p_{target}$ (i.e. when the source radio cell 130a and the target radio cell 130b are load-balanced), the eNB 110a may optionally comprise transmitting 240 a signal to one or more UEs served by the eNB 110a. The optionally transmitted signal comprises a request to the UE(s) to measure a signal parameter pertaining to the source radio cell 130a and to measure a signal parameter pertaining to the target radio cell 130b. In the embodiment illustrated in FIG. 2, the signal parameter is a Reference Signal Received Power (RSRP) value.

The eNB 110a receives 250 a signal, from each one of one or several UE(s) served by the eNB 110a. The received signal(s) comprise(s), for each of the UE(s) from which a signal(s) is/are received, measured RSRP values pertaining to the source radio cell 130a and the target radio cell 130b, respectively.

The eNB 110a determines 260 one or more UEs for subsequent selection. The determination of which UE(s) to select is based on the measured RSRP value of the source radio cell 130a and the measured RSRP value pertaining to the target radio cell 130b for each of the UE(s) from which the eNB 110a received 250 signals.

In one embodiment, the eNB 110a compares a measured RSRP value pertaining to the source radio cell 130a and a measured RSRP value pertaining to the target radio cell 130b for each of the UE(s), and determines 260 the UE(s) to select on the basis of which UE(s) has/have the largest difference between the measured RSRP value pertaining to the target radio cell 130b and the measured RSRP value pertaining to the source radio cell 130a. When determining 260 the UE(s) to select on the basis of which UE(s) has/have the largest difference between the measured RSRP value pertaining to the target radio cell 130b and the measured RSRP value pertaining to the source radio cell 130a, the difference should be understood to mean the difference $RSRP_{target} - RSRP_{source}$, i.e. not the absolute value but the difference including the positive or negative sign. In an alternative embodiment, the eNB 110a determines 260 the UE(s) to select on the basis of which UE(s) has/have the highest measured RSRP value(s) pertaining to the target radio cell 130*b*. The above two criteria can, thus, be used to determine the most appropriate UE(s) for the subsequent selection, which will be detailed hereinbelow. The most appropriate UE(s) can, hence, be seen as those UE(s) that would experience the best improvement in terms of resource utilization if they are moved from the source radio cell 130*a* to the target radio cell 130*b*. For example, some UEs may require less number of PRBs in the target radio cell (compared with the required number of PRBs in the source radio cell) due to a better RSRP value pertaining to the target radio cell.

Based on the determination 260, the eNB 110*a* selects 270 one or several UE(s) to move from the source radio cell 130*a* to the target radio cell 130*b*. In one embodiment, the eNB 110*a* selects a certain percentage of the total number of served UE(s). For example, the eNB 110 may select that 5%, 10% or 15% of the total number of UEs are to be moved from the source radio cell 130*a* to the target radio cell 130*b*. The exact percentage of UE(s) that should be moved to the target radio cell 130*b* may vary and the exact percentage of UEs that should or could be moved to the target radio cell 130*b* is preferably tested and evaluated for each specific case, e.g. in dependence of operator needs or requirements. In an alternative embodiment, the eNB 110 selects a certain maximum number of UEs to be moved move from the source radio cell to the target radio cell. The maximum number of UEs may, for example, be 2, 5, 10 or 20 UEs. The exact maximum number of UEs that should be moved to the target radio cell may also vary and the exact maximum number of UEs is preferably tested and evaluated for each specific case, e.g. in dependence of operator needs or requirements.

Figure 3A:
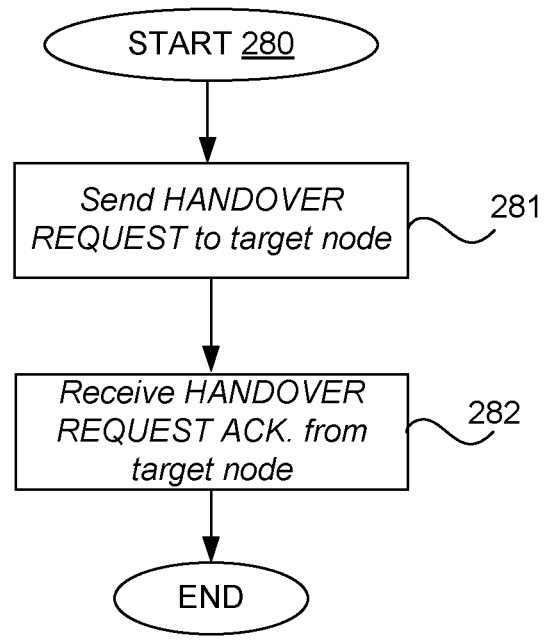
FIG. 3a is a flow chart illustrating method steps in accordance with various embodiments.

Subsequently, the selected one or several UEs are moved 280 from the source radio cell 130*a* to the target radio cell 130*b*. As is illustrated in FIG. 3*a*, the moving 280 of the one or more selected UEs may comprise transmitting 281 a signal 310 (see FIG. 3*b*) including a HANDOVER REQUEST 311 to the eNB 110*b* that is serving the target radio cell 130*b*. In some embodiments, the signal 310 including the HANDOVER REQUEST 311 may additionally comprise a cause information element 312 indicating the cause of the movement of UE(s). The cause may be called "UE Rotation", which would indicate to the receiving eNB 110*b* that the UE in question should be moved due to a cause in accordance with a herein described embodiment. In response, the eNB 110*a* may receive 282 a signal 320 including a HANDOVER REQUEST ACKNOWLEDGEMENT 321 from the eNB 110*b*. The HANDOVER REQUEST ACKNOWLEDGMENT 321 thus indicates to the eNB 110*a* that the HANDOVER REQUEST is acknowledged by eNB 110*b*. Thereafter, the selected UE(s) can be moved from the source radio cell 130*a* of the source eNB 110*a* to the target radio cell 130*b* served by eNB 110*b*.

Turning now to FIG. 1B, an example scenario is illustrated where two UEs, e.g. UEs 120*c* and 120*d*, are moved from radio cell 130*a* to radio cell 130*b* and where two UEs, e.g. UEs 120*f* and 120*g*, are moved in the opposite direction using any of the above-mentioned embodiments. These UEs may be moved from a respective radio cell to a new respective radio cell because the determination 260 yields that these UEs would benefit most from being moved from its source radio cell to the other radio cell, i.e. the target radio cell. This may improve the utilization of resources in the radio cell 130*a* and the radio cell 130*b*, respectively.

Figure 3B:
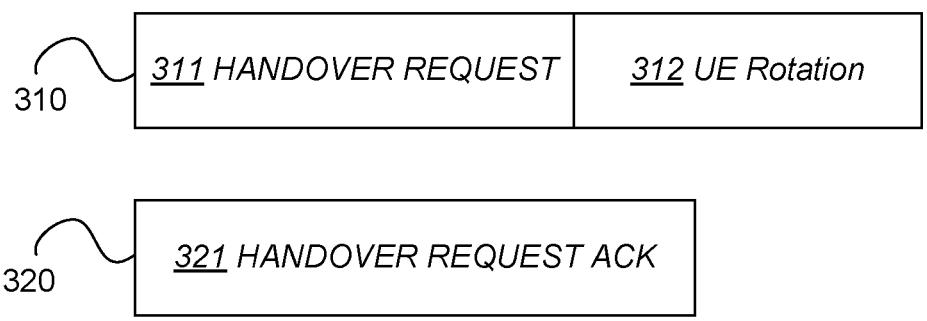
FIG. 3b illustrates a format, or constitution, of two signals according to some embodiments.
Figure 4:
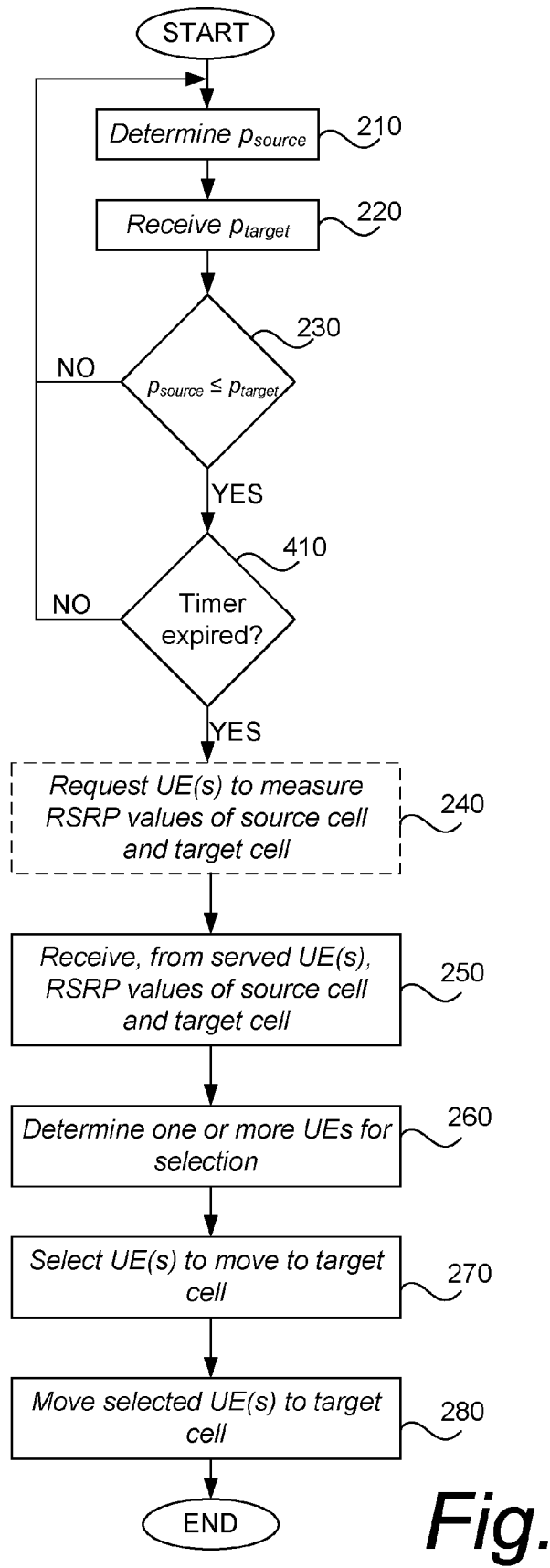
FIG. 4 is a flow chart illustrating a method according to another embodiment.

FIG. 4 illustrates another example embodiment. This example embodiment is similar to the embodiment shown in FIGS. 2-3. Like reference numbers therefore refer to like elements in FIG. 2 and FIG. 3. Also, in order to ease the understanding of the embodiment shown in FIG. 4, only those steps that differ between the two procedures will be detailed hereinbelow.

In the method illustrated in FIG. 4, a timer or timer function is started 410 in case the traffic load parameter of the source radio cell is determined to be below or equal to traffic load parameter of the target radio cell. This way, the subsequent steps 240-280 are only performed when a certain pre-defined time period has lapsed. This pre-defined time period can advantageously be set to be the same as the earlier-mentioned pre-set intervals for determining the traffic load parameters (i.e., 5, 10, 15, 20, 25 or 30 seconds). Consequently, only when the timer or timer function has reached its pre-defined time limit it will continue performing the subsequent steps 240-280. This may be advantageous in that the subsequently selected UE(s) are moved from the source radio cell 130*a* to the target radio cell 130*b* only when a certain, pre-defined, time has lapsed since it was last determined that the traffic load parameter $p_{source}$ the source radio cell is below or equal to traffic load parameter $p_{target}$ of the target radio cell.

Figure 5:
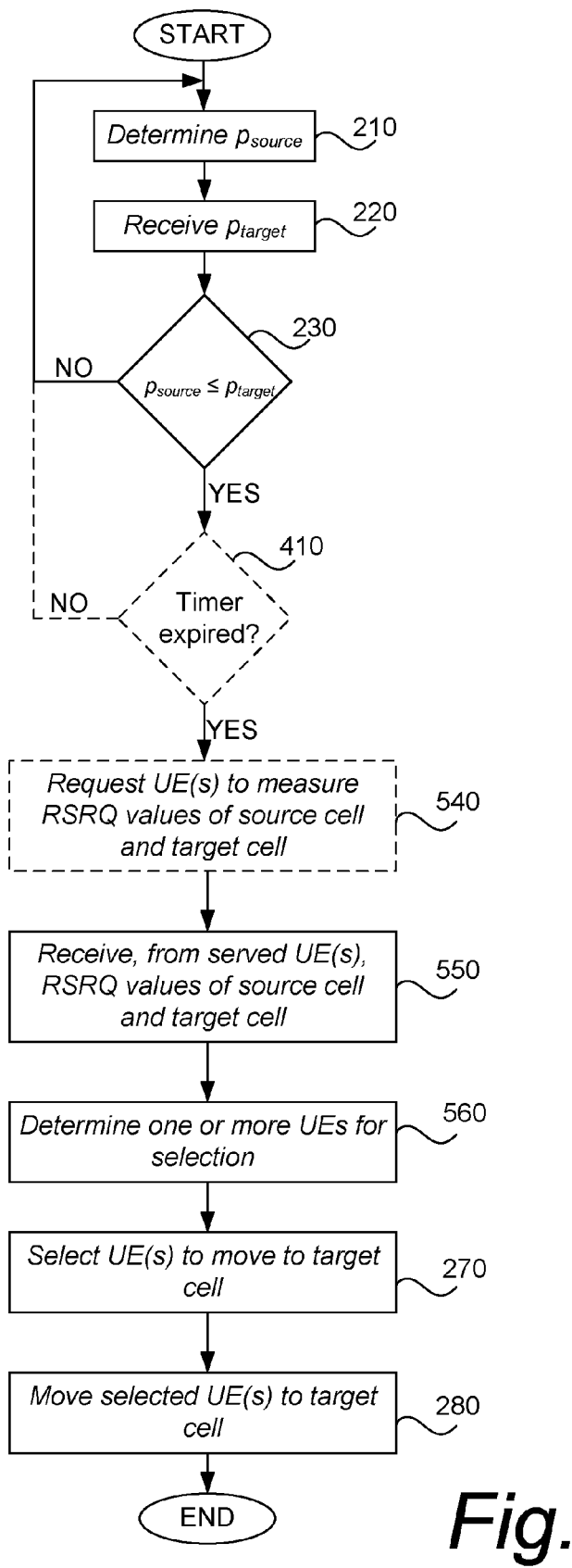
FIG. 5 is a flow chart illustrating a method according to yet another embodiment.

FIG. 5 illustrates yet another example embodiment. This example embodiment is similar to the embodiment shown in FIGS. 2-3. Like reference numbers therefore refer to like elements in FIG. 2 and FIG. 3. In order to ease the understanding of the embodiment shown in FIG. 5, only those steps that differ between the two procedures will be detailed hereinbelow.

In the method illustrated in FIG. 5, the eNB 110*a* receives 550 a signal, from each one of one or several UE(s) served by the eNB 110*a*. The received signal(s) comprise(s), for each of the UE(s) from which a signal is received, measured Reference Signal Received Quality (RSRQ) values pertaining to the source radio cell 130*a* and the target radio cell 130*b*, respectively. In other words, this embodiment differs from the embodiment in FIG. 2 in that the eNB 110*a* receives signals(s) including RSRQ values instead of RSRP values. Similar to the embodiment in FIG. 2, the eNB 110*a* determines 560 one or more UEs for subsequent selection. The determination of which UE(s) to select is based on the measured RSRQ value of the source radio cell 130*a* and the measured RSRQ value pertaining to the target radio cell 130*b* for each of the UE(s) from which the eNB 110*a* received 550 signals. In one example embodiment, the eNB 110*a* compares a measured RSRQ value pertaining to the source radio cell 130*a* and a measured RSRQ value pertaining to the target radio cell 130*b* for each of the UE(s), and determines 560 the UE(s) to select on the basis of which UE(s) has/have the largest difference between the measured RSRQ value pertaining to the target radio cell and the measured RSRQ value pertaining to the source radio cell. When determining 560 the UE(s) to select on the basis of which UE(s) has/have the largest difference between the measured RSRQ value pertaining to the target radio cell 130*b* and the measured RSRQ value pertaining to the source radio cell 130*a*, the difference should be understood to mean the difference $RSRQ_{target} - RSRQ_{source}$, i.e. not the absolute value but the difference including the positive or negative sign. In an alternative embodiment, the eNB 110*a* determines 560 the UE(s) to select on the basis of which UE(s) has/have the highest measured RSRQ value(s) pertaining to the target radio cell. Again, the most appropriate UE(s) can, hence, be seen as those UE(s) that would experience the best improvement in terms of resource utilization if they are moved from the source radio cell 130*a* to the target radio cell 130*b*.

As can be seen, the method illustrated in FIG. 5 can optionally also include starting 410 a timer or timer function in case the traffic load parameter of the source radio cell is determined to be below or equal to traffic load parameter of the target radio cell. This was described in connection with FIG. 4 and will therefore not be repeated here.

According to some of the embodiments disclosed throughout this disclosure, the inventors propose to move (e.g., handover) UEs from a source radio cell to a target radio cell when the source radio cell and the target radio cell are load-balanced (i.e. $p_{source}$ is the same or substantially the same as $p_{target}$), or when these two cells have been load-balanced for a certain period of time. Although this may have a temporary negative effect on (or, at least counteract) the balance of the traffic load between the two cells, the movement of UEs may improve the resource utilization. For example, resource utilization in terms of how much radio resources that are required for transmitting/receiving an information bit to/from an UE (e.g. bits/PRB) can be improved. In some embodiments only those UE(s) that would benefit most from being moved from one radio cell to another are moved. As discussed hereinabove, there are various ways of determining which UE(s) would benefit most from a movement, such as using measured signal parameters (e.g., in terms of RSRP or RSRQ). As will be appreciated, the movement of UEs may cause a temporary load imbalance in favor of better resource utilization. Nevertheless, the caused temporary load imbalance can anyhow trigger a later load balancing in the network to compensate for the newly created imbalance in load distribution between the radio cells.

According to some other embodiments disclosed throughout this disclosure, the inventors propose to move (e.g. handover) UEs from a source radio cell to a target radio cell when the traffic load of the source radio cell is lower than that of the target radio cell (i.e. $p_{source}$ is below $p_{target}$), or when the traffic load of the source radio cell has been below the traffic load of the target radio cell for a certain period of time. As was described in the background, the load balancing would in such case have the effect that UEs are only moved in one direction, i.e the UEs would generally be moved in the direction from the radio cell with the comparatively higher traffic load to the other radio cell (i.e the radio cell having the comparatively lower traffic load). However, and in contrast, with embodiments of this disclosure one or more UEs can be moved in the opposite direction, i.e. from the radio cell having the lower traffic load to the radio cell having the higher traffic load. Although this may counter-act the current load situation between the two cells, this may advantageously improve the resource utilization. Also, in some embodiments only those UE(s) that would benefit most from being moved from one radio cell to another are moved. As discussed hereinabove, there are various ways of determining which UE(s) would benefit most from a movement, such as using measured signal parameters (e.g., in terms of RSRP or RSRQ).

It is also conceivable that, in some embodiments, one or several UEs are excluded (or blocked) from being moved from a source radio cell to a target radio cell in accordance with the herein-described embodiments. For example, UEs that are generally excluded from load balancing may also be excluded from being moved from a source radio cell to a target radio cell. An example of an excluded UE could be an UE with an ongoing emergency call.

In conclusion, some of the embodiments described herein may allow for a solution which prevents a load-balanced load distribution between radio cells in favor of improving resource utilization, capacity and/or performance. Also, some embodiments may allow for a solution where radio cells with constantly lower traffic load are allowed to exchange its resource-demanding UEs with less resource-demanding UEs from a cell with a higher load.

Figure 6:
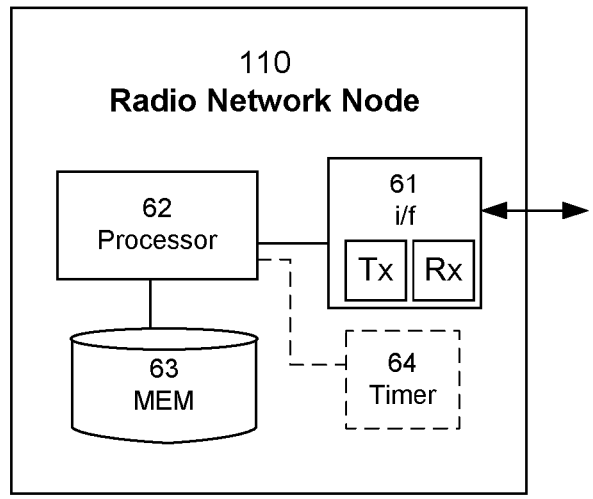
FIG. 6 shows an example embodiment of a radio network node.

Turning now to FIG. 6, an example embodiment of a radio network node for a source radio cell will be described. The radio network node is configured to perform the method according to the various embodiments described hereinabove. The radio network node may, e.g., be embodied as an eNB such as the eNB 110*a* or eNB 100*b*. In the illustrated embodiment, the radio network node 110 comprises a communication interface 61, a processor 62, a memory 63, and optionally a timer 64. The communication interface 61 may comprise a transmitter Tx and a receiver Rx, or alternatively a transceiver Tx/Rx having both receiving and transmission capabilities.

The receiver 61 is configured to receive, from radio network node serving a target radio cell, a signal comprising a traffic load parameter $p_{target}$ pertaining to a traffic load of the target radio cell. The receiver 61 is also configured to receive a signal, from each one of one or more UEs 120*a-e*. For each UE of the one or more UEs, this signal may comprise a measured signal parameter (e.g. a RSRP value or a RSRQ value as described hereinabove) pertaining to the source radio cell 130*a* and a measured signal parameter pertaining to the target radio cell 130*b*.

The memory 63 stores computer program code which, when run in the processor 62, causes the eNB 110 to determine a traffic load parameter $p_{source}$ pertaining to a traffic load of a source radio cell 130*a*; compare the traffic load parameter $p_{source}$ of the source radio cell 130*a* with the traffic load parameter $p_{target}$ of the target radio cell 130*b* to determine whether the traffic load parameter $p_{source}$ of the source radio cell 130*a* is below or equal to the traffic load parameter $p_{target}$ of the target radio cell 130*b*; to determine one or more UEs to select, based on the measured signal parameter pertaining to the source radio cell 130*a* and the measured signal parameter pertaining to the target radio cell 130*b* for each of the UEs; to select to move the determined one or more UEs from the source radio cell 130*a* to the target radio cell 130*b*, in case the traffic load parameter of the source radio cell is determined to be below or equal to traffic load parameter of the target radio cell; and furthermore to move (e.g. handover) the selected UEs to the target radio cell 130*a*.

The transmitter 61 may additionally be configured to transmit a signal to said one or more UEs. This signal may comprise a request to the UEs to measure a signal parameter pertaining to the source radio cell 130*a* and to measure a signal parameter pertaining to the target radio cell 130*b*.

In some embodiments, the memory 63 and the computer program code are configured to, with the processor 62, cause the radio network node 110 to start a timer 64 in case the in case the traffic load parameter of the source radio cell is determined to be below or equal to traffic load parameter of the target radio cell. For example, the memory 63 and the computer program code may also be configured to, with the processor 62, move the selected UEs only in response to that the timer 64 has reached a pre-defined time limit.

The above-mentioned signal parameter may be a RSRP value. The memory 63 and the computer program code may thus be configured to, with the processor 62, cause the radio network node 110 to compare a measured RSRP value pertaining to the source radio cell and a measured RSRP value pertaining to the target radio cell for each of the UEs, and determine the UEs to select on the basis of which UEs has/have the largest difference between the measured RSRP value pertaining to the target radio cell and the measured RSRP value pertaining to the source radio cell. Additionally, or alternatively, the memory 63 may be configured to, with the processor 62, to cause the radio network node to determine the UEs to select on the basis of which UEs has/have the highest measured RSRP values pertaining to the target radio cell.

Additionally, or alternatively, the above-mentioned signal parameter may be a RSRQ value. The memory 63 and the computer program code may thus be configured to, with the processor 62, to cause the radio network node 110 to compare a measured RSRQ value pertaining to the source radio cell and a measured RSRQ value pertaining to the target radio cell for each of the UEs, and determine the UEs to select on the basis of which UEs has/have the largest difference between the measured RSRQ value pertaining to the target radio cell and the measured RSRQ value pertaining to the source radio cell. Additionally, or alternatively, the memory 63 may be configured to, with the processor 62, to cause the radio network node to determine the UEs to select on the basis of which UEs has/have the highest measured RSRQ values pertaining to the target radio cell.

Furthermore and with reference also to FIG. 3b, the transmitter 61 may be configured to transmit a signal 310 (see FIG. 3B) including a HANDOVER REQUEST 311 to the radio network node that is serving the target radio cell. This signal 310 may additionally comprise a cause information element 312 indicating the cause of the movement of UEs. Moreover, the receiver 61 may be configured to receive a signal 311 including a HANDOVER REQUEST ACKNOWLEDGEMENT from the radio network node that is serving the target radio cell.

In some embodiments, the memory 63 and the computer program code may be configured to, with the processor 62, to cause the radio network node 110 to determine the traffic load parameter of a source radio cell pertaining to the traffic load of the source radio cell; determine the traffic load parameter of a target radio cell pertaining to the traffic load of the target radio cell; and compare the traffic load parameter of the source radio cell with the traffic load parameter of the target radio cell to determine whether the traffic load parameter of the source radio cell is below or equal to the traffic load parameter of the target cell continuously or at pre-set intervals during a pre-defined period of time.

Moreover, the memory 63 and the computer program code are configured to, with the processor 62, to cause the radio network node 110 to determine that the source radio cell and the target radio cell are load-balanced in case the traffic load parameter of the source radio cell is equal to the traffic load parameter of the target radio cell.

Figure 7:
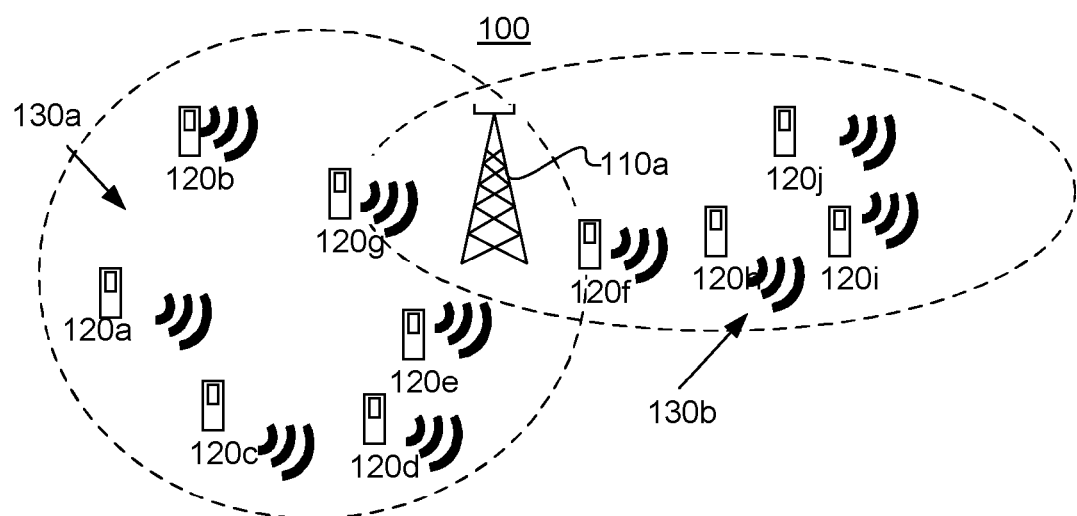
FIG. 7 shows a schematic illustration of an example radio access network.

It should be appreciated that herein described principles, aspects, and embodiments are applicable when neighboring radio cells cover different geographical areas. It should also be appreciated that herein described principles, aspects, and embodiments are applicable when neighboring radio cells are overlapping or partly overlapping. Also, it should be appreciated that herein described principles, aspects, and embodiments are applicable when neighboring radio cells are on the same frequency or when neighboring radio cells are on different frequencies. Moreover, herein described principles, aspects, and embodiments are applicable when a single radio network node, e.g. eNB 110a, serves two neighboring radio cells 130a and 130b as schematically illustrated in FIG. 7. If so, the eNB 110a serves both the source radio cell 130a and the target radio cell 130b. In such embodiment, the eNB 110a could thus act as both a source eNB and a target eNB in X2 signaling procedures. Alternatively, there is no need to use the X2 interface but the eNB 110 can instead perform herein described methods without involving the X2 interface. Accordingly, rather than receiving a signal including the traffic load parameter $p_{target}$ of the target radio cell, the eNB 110a would determine the traffic load parameter $p_{target}$ of the target radio cell itself.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Although the various embodiments of this disclosure have been described above with reference to specific embodiments, it is not intended to be limited to the specific form set forth herein. For example, while the various embodiments have been described with respect to a 3GPP LTE radio communication system, the embodiments disclosed herein could equally possible be applied in other radio communication systems such as a 3GPP UMTS radio communication system. If so, the radio network node could, e.g., be embodied as a Radio Network Controller (RNC). The embodiments of this disclosure are limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A method of load balancing performed by a radio network node, which is serving a source radio cell, the method comprising:
   determining a traffic load parameter pertaining to a traffic load of the source radio cell;
   receiving, from a radio network node serving a target radio cell, a signal comprising a traffic load parameter pertaining to a traffic load of the target radio cell;
   comparing the traffic load parameter of the source radio cell with the traffic load parameter of the target radio cell to determine whether the traffic load parameter of the source radio cell is below or equal to the traffic load parameter of the target radio cell;
   starting a timer in case the traffic load parameter of the source radio cell is determined to be below or equal to the traffic load parameter of the target radio cell and when the timer has reached a pre-defined time limit, the radio network node serving the source radio cell performing:
      receiving a signal from each one of a plurality of user equipments (UEs), the signal comprising a measured signal parameter pertaining to the source radio cell and a measured signal parameter pertaining to the target radio cell;
      determining one or more UE(s) of the plurality of UEs to select, based on the measured signal parameter pertaining to the source radio cell and the measured signal parameter pertaining to the target radio cell for each of the plurality of UE(s);
      selecting to move the determined one or more UE(s) from the source radio cell to the target radio cell, in case the traffic load parameter of the source radio cell is below or equal to traffic load parameter of the target radio cell; and
      moving the selected one or more UE(s) to the target radio cell when the timer has reached the pre-defined time limit.

2. The method according to claim 1, further comprising, prior to receiving the signal from each one of the plurality of UE(s):
   transmitting a signal to the plurality of UE(s), the signal comprising a request to the plurality of UE(s) to measure a signal parameter pertaining to the source radio cell and to measure a signal parameter pertaining to the target radio cell.

3. The method according to claim 1, wherein the signal parameter pertaining to the source radio cell and the signal parameter pertaining to the target radio cell is a Reference Signal Received Power, RSRP, value.

4. The method according to claim 3, comprising:
   comparing a measured RSRP value pertaining to the source radio cell with a measured RSRP value pertaining to the target radio cell for each of the plurality of UEs, and
   determining the one or more UE(s) to select on the basis of which UE(s) of the plurality of UEs has/have a largest difference between the measured RSRP value pertaining to the target radio cell and the measured RSRP value pertaining to the source radio cell.

5. The method according to claim 3, comprising:
   determining the one or more UE(s) to select on the basis of which UE(s) of the plurality of UEs has/have a highest measured RSRP value(s) pertaining to the target radio cell.

6. The method according to claim 1, wherein the signal parameter pertaining to the source radio cell and the signal parameter pertaining to the target radio cell is a Reference Signal Received Quality, RSRQ, value.

7. The method according to claim 6, comprising:
   comparing a measured RSRQ value pertaining to the source radio cell with a measured RSRQ value pertaining to the target radio cell for each of the plurality of UEs, and
   determining the one or more UE(s) to select on the basis of which UE(s) of the plurality of UEs has/have a largest difference between the measured RSRQ value pertaining to the target radio cell and the measured RSRQ value pertaining to the source radio cell for each of the plurality of UEs.

8. The method according to claim 6, comprising:
   determining the one or more UE(s) to select on the basis of which UE(s) of the plurality of UEs has/have a highest measured RSRQ value(s) pertaining to the target radio cell.

9. The method according to claim 6, wherein moving the selected one or more UE(s) to the target radio cell comprises transmitting a signal including a HANDOVER REQUEST to the radio network node that is serving the target radio cell.

10. The method according to claim 9, wherein the signal including the HANDOVER REQUEST additionally comprises a cause information element indicating the cause of the movement of the one or more UE(s).

11. The method according to claim 9, comprising receiving a signal including a HANDOVER REQUEST ACKNOWLEDGEMENT from the radio network node that is serving the target radio cell.

12. The method according to claim 6, wherein determining the traffic load parameter of the source radio cell pertaining to the traffic load of the source radio cell; receiving the signal comprising the traffic load parameter of the target radio cell pertaining to the traffic load of the target radio cell; and comparing the traffic load parameter of the source radio cell with the traffic load parameter of the target radio cell to determine whether the traffic load parameter of the source radio cell is below or equal to the traffic load parameter of the target cell are performed continuously or at pre-set intervals.

13. The method according to claim 6, comprising:
   determining that the source radio cell and the target radio cell are load-balanced in case the traffic load parameter of the source radio cell is equal to the traffic load parameter of the target radio cell.

14. A radio network node for serving a source radio cell, the radio network node comprising:

a receiver configured to receive, from a radio network node serving a target radio cell, a signal comprising a traffic load parameter pertaining to a traffic load of the target radio cell;
a timer;
a processor; and
a memory storing computer program code, which, when run in the processor causes the radio network node serving the source radio cell to:
determine a traffic load parameter pertaining to a traffic load of the source radio cell;
compare the traffic load parameter of the source radio cell with the traffic load parameter of the target radio cell to determine whether the traffic load parameter of the source radio cell is below or equal to the traffic load parameter of the target radio cell;
start the timer in case the traffic load parameter of the source radio cell is determined to be below or equal to the traffic load parameter of the target radio cell;
when the timer has reached a pre-defined time limit, the computer program code, which, when run in the processor causes the radio network node serving the source radio cell further to:
receive a signal from each one of a plurality of user equipments (UEs), the signal comprising a measured signal parameter pertaining to the source radio cell and a measured signal parameter pertaining to the target radio cell;
determine one or more UE(s) of the plurality of UEs to select, based on the measured signal parameter pertaining to the source radio cell and the measured signal parameter pertaining to the target radio cell for each of the plurality of UE(s);
select to move the determined one or more UE(s) from the source radio cell to the target radio cell, in case the traffic load parameter of the source radio cell is below or equal to the traffic load parameter of the target radio cell; and
move the selected one or more UE(s) to the target radio cell when the timer has reached the pre-defined time limit.

15. The radio network node for serving the source radio cell according to claim 14, further comprising:
a transmitter configured to transmit a signal to the plurality of UE(s), the signal comprising a request to the plurality of UE(s) to measure a signal parameter pertaining to the source radio cell and to measure a signal parameter pertaining to the target radio cell.

16. The radio network node for serving the source radio cell according to claim 14, wherein the signal parameter pertaining to the source radio cell and the signal parameter pertaining to the target radio cell is a Reference Signal Received Power, RSRP, value.

17. The radio network node for serving the source radio cell according to claim 16, wherein the memory and the computer program code are configured to, with the processor, cause the radio network node to:
compare a measured RSRP value pertaining to the source radio cell and a measured RSRP value pertaining to the target radio cell for each of the plurality of UEs, and
determine the one or more UE(s) to select on the basis of which UE(s) of the plurality of UEs has/have a largest difference between the measured RSRP value pertaining to the target radio cell and the measured RSRP value pertaining to the source radio cell.

18. The radio network node for serving the source radio cell according to claim 16, wherein the memory and the computer program code are configured to, with the processor, cause the radio network node to:
determine the one or more UE(s) to select on the basis of which UE(s) of the plurality of UEs has/have a highest measured RSRP value(s) pertaining to the target radio cell.

19. The radio network node for serving the source radio cell according to claim 14, wherein the signal parameter pertaining to the source radio cell and the signal parameter pertaining to the target radio cell is a Reference Signal Received Quality, RSRQ, value.

20. The radio network node for serving the source radio cell according to claim 19, wherein the memory and the computer program code are configured to, with the processor, cause the radio network node to:
compare a measured RSRQ value pertaining to the source radio cell with a measured RSRQ value pertaining to the target radio cell for each of the plurality of UEs, and
determine the one or more UE(s) to select on the basis of which UE(s) of the plurality of UEs has/have a largest difference between the measured RSRQ value pertaining to the target radio cell and the measured RSRQ value pertaining to the source radio cell for each of the plurality of UEs.

21. The radio network node for serving the source radio cell according to claim 19, wherein the memory and the computer program code are configured to, with the processor, cause the radio network node to:
determine the one or more UE(s) to select on the basis of which UE(s) of the plurality of UEs has/have a highest measured RSRQ value(s) pertaining to the target radio cell.

22. The radio network node for serving the source radio cell according to claim 15, wherein the transmitter is configured to transmit a signal including a HANDOVER REQUEST to the radio network node that is serving the target radio cell.

23. The radio network node for serving the source radio cell according to claim 22, wherein the transmitter is configured to transmit the signal including the HANDOVER REQUEST and wherein this signal additionally comprises a cause information element indicating the cause of the movement of one or more UE(s).

24. The radio network node for serving the source radio cell according to claim 22, wherein the receiver is configured to receive a signal including a HANDOVER REQUEST ACKNOWLEDGEMENT from the radio network node that is serving the target radio cell.

25. The radio network node for serving the source radio cell according to claim 14, wherein the receiver is configured to receive the signal comprising the traffic load parameter of the target radio cell pertaining to the traffic load of the target radio cell continuously or at pre-set intervals and wherein the memory and the computer program code are configured to, with the processor, cause the radio network node to determine the traffic load parameter of the source radio cell pertaining to the traffic load of the source radio cell; and compare the traffic load parameter of the source radio cell with the traffic load parameter of the target radio cell to determine whether the traffic load parameter of the source radio cell is below or equal to the traffic load parameter of the target cell continuously or at pre-set intervals.

26. The radio network node for serving the source radio cell according to claim 14, wherein the memory and the computer program code are configured to, with the processor, to cause the radio network node to:

determine that the source radio cell and the target radio cell are load-balanced in case the traffic load parameter of the source radio cell is equal to the traffic load parameter of the target radio cell.

27. The radio network node for serving the source radio cell according to claim 14, wherein the radio network node serving the source radio cell and the radio network node serving the target radio cell is an evolved NodeB.

* * * * *